United States Patent [19]
McGough

[11] Patent Number: 6,047,065
[45] Date of Patent: Apr. 4, 2000

[54] COIN RECEPTACLE COVER FOR PAY TELEPHONES

[75] Inventor: Gerald B. McGough, Huntsville, Ala.

[73] Assignee: Quadrum Telecommunications, Inc., Huntsville, Ala.

[21] Appl. No.: 08/915,062

[22] Filed: Aug. 20, 1997

Related U.S. Application Data

[60] Provisional application No. 60/043,731, Apr. 16, 1997, and provisional application No. 60/027,168, Oct. 1, 1996.

[51] Int. Cl.⁷ ............................. H04M 1/00; H04M 17/00
[52] U.S. Cl. ........................... 379/451; 379/437; 379/145
[58] Field of Search .................................. 379/451, 437, 379/453, 145, 146, 147; 312/223.4; 52/27.5

[56] References Cited

U.S. PATENT DOCUMENTS 5,061,023  10/1991  Soubliere et al. .
5,402,476   3/1995  Ohayon ................................... 379/451

FOREIGN PATENT DOCUMENTS 0 394 600 A3  10/1990  European Pat. Off. .
  0394600     10/1990  European Pat. Off. .
 25 38 025     3/1977  Germany .
  1532835     11/1978  Germany .
 43 42 350     4/1995  Germany .

*Primary Examiner*—Jack Chiang
*Attorney, Agent, or Firm*—Gardner & Groff, P.C.

[57] ABSTRACT

A coin receptacle cover for attachment to a coin receptacle box and subsequent use in a pay telephone comprising a panel, connectable to a coin receptacle box, which defines an opening therethrough for admitting coins into the coin receptacle box. The cover also comprises a movable door mounted for linear reciprocating movement between a closed position covering the opening and an open position uncovering the opening. An actuator arm is mounted for pivotal movement and includes a finger which is engageable by a pay telephone for pivoting the actuating arm upon installation of the coin receptacle cover in a pay telephone. Additionally, a pin and slot arrangement between the movable door and the actuator arm is provided for converting pivotal movement of the actuator arm into linear reciprocating movement of the movable door. The coin receptacle cover further comprises a linear track and the movable door has a guide pin slidable within the linear track. The opening has a substantially rectangular shape and the entirety of the opening is coverable and uncoverable by the movable door.

22 Claims, 5 Drawing Sheets

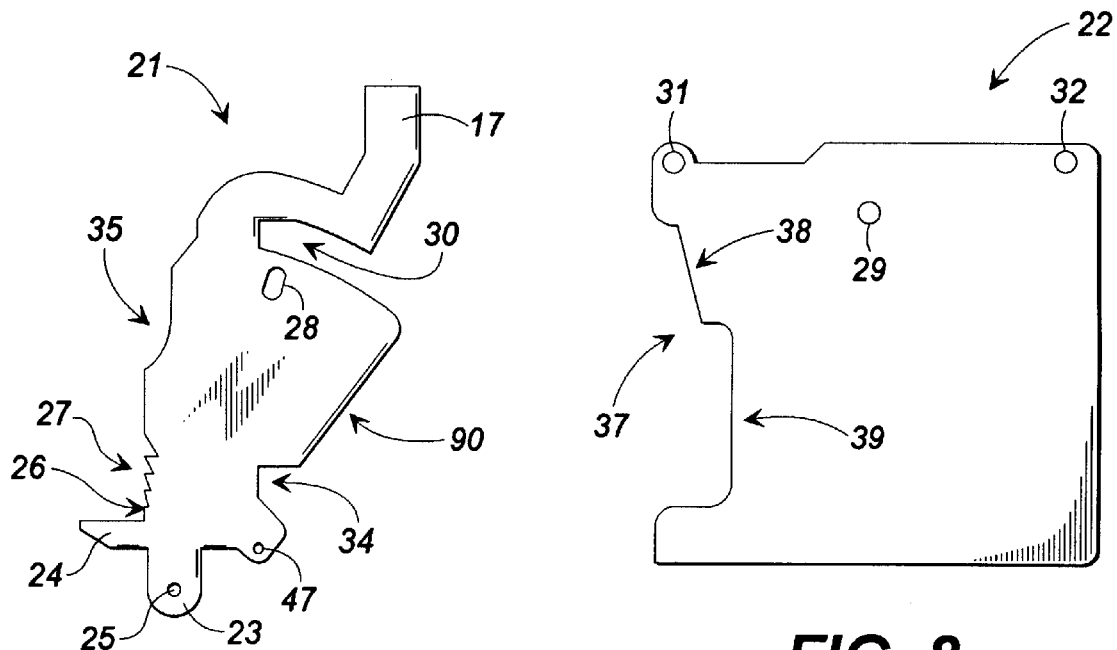
FIG. 7
FIG. 8
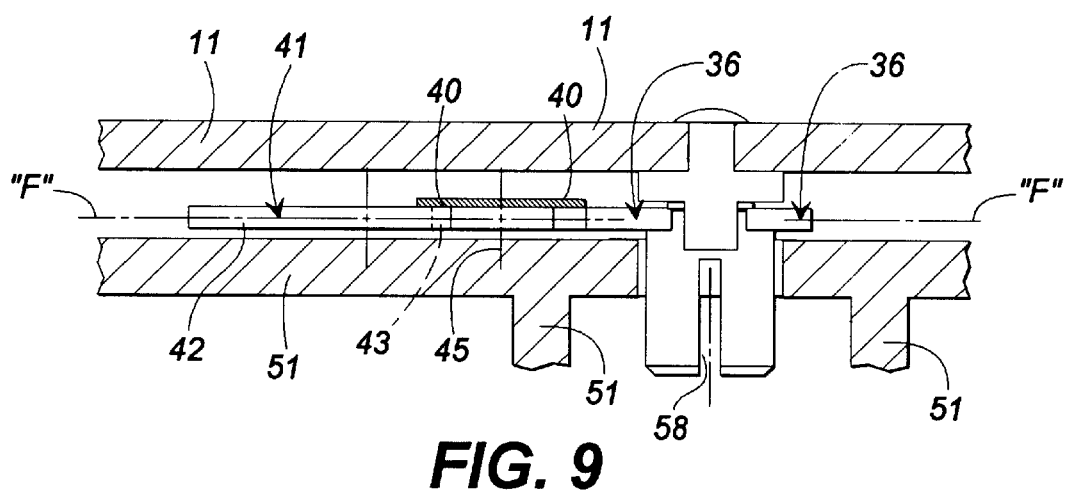
FIG. 9

COIN RECEPTACLE COVER FOR PAY TELEPHONES

This application claims benefit of Provisional application Ser. No. 60/043,731 filed Apr. 16, 1997, also Ser. No. 60/027,168 filed Oct. 1, 1996.

TECHNICAL FIELD

The present invention relates to pay telephones and, more particularly, to a coin receptacle device for protecting pay telephones against pilferage from collectors.

BACKGROUND OF THE INVENTION

For many years, pay telephone owners have relied on employees or contractors to collect money from their pay telephones by traveling to a plurality of pay telephones, by emptying coins previously deposited in the pay telephones, and by transporting the coins back to the owners. Unfortunately, some of the "collectors" have been less than honest and have stolen large amounts of collected money from the telephone owners. Such theft has been enabled, in part, by the unsupervised access of the collectors to the money and by the absence of any accurate records as to the exact amount of money previously deposited in the pay telephones. Without accurate records, the owner of a pay telephone could not determine whether or not any money had been stolen by a collector. Such theft has also been enabled, in part, by the absence of coin-handling devices designed to prevent theft of money by the collectors. In some older pay telephones, deposited coins fell into open-top hoppers within the pay telephones for keeping until the coins were dumped out of the hoppers and transported to the pay telephone owners by collectors. With unsupervised access to the hoppers, the collectors could brazenly pocket all of the coins from the hoppers or could pocket a portion of the coins from the hoppers, thereby "skimming" money from the owner of a pay telephone.

In an attempt at stemming this theft problem, the manufacturers of newer pay telephones have incorporated, into each pay telephone, a security-sealed, coin receptacle box which resides in a steel-reinforced vault within the pay telephone and which receives coins accepted by the pay telephone. To collect the money from the pay telephone, a collector removes the coin receptacle box from the phone's vault, inserts an empty coin receptacle box into the phone's vault, and transports the removed coin receptacle box to the phone's owner. The coin receptacle box is, typically, manufactured from steel and has a tamper-resistant cover with an opening that allows accepted coins to pass from the phone's coin handling mechanism into the coin receptacle box for temporary storage until the box is replaced by a collector. The cover has a pivotally-mounted metal door which automatically rotates into a first position to cover the opening when the coin receptacle box is not within the vault of the pay telephone and which automatically rotates into a second position to uncover the opening (i.e., allowing accepted coins to pass through the opening) when the coin receptacle box resides within the vault of the pay telephone. By limiting access to the coins within the coin receptacle box when the box is outside the pay telephone, the metal door makes it difficult, but not impossible, for a collector to gain access to the coins within the box, thereby reducing the opportunity for theft of the coins.

While such prior art covers and their metal doors have had some impact on reducing theft by collectors, the covers and metal doors have certain disadvantages and/or problems.

First, the size of the metal door (and, therefore, the size of the opening) in such a cover cannot be made large enough to allow the cover to pass coins of certain foreign countries which measure up to 35 millimeters in their maximum dimension. This disadvantage results from the way in which the metal door operates and from dimensional limitations on the size of the metal door. To cause the covering and uncovering of the opening, the metal door pivots, relative to a pivot point, along a fixed arcuate path within the cover. The metal door has a protruding member which extends from the cover through a groove in the top of the cover and which rotates between first and second ends of the groove in response to engagement with an internal component of the pay telephone. The amount (i.e., angle) of rotational movement of the protruding member and, therefore, the amount of rotational movement of the metal door is determined by and, hence, limited by the internal component of the pay telephone. Therefore, the path of rotation and the amount of rotation are fixed by factors external to the cover and a larger metal door, if desired to enable passage of large coins, would be forced to travel along the same path of rotation and through the same amount of rotation. Unfortunately, because the maximum size and internal dimensions of a cover are determined by and, hence, limited by the size of the vault within the pay telephone and by the dimensions of a coin receptacle box, a larger metal door cannot physically travel along the pre-determined path of rotation through the pre-determined amount of rotation within the pre-determined internal dimensions of the cover and still fully cover and uncover a cooperatively-sized larger opening through the cover. Thus, physical limitations render it impossible to increase the size of the metal door and opening of a cover, using the above-described prior art design, to allow passage of large coins of certain foreign countries.

A second disadvantage of the prior art cover is that the cover is often accidentally triggered by a collector who drops the coin receptacle box and cover or, in some other way, subjects the cover to a mechanical shock prior to insertion of the box and cover into the vault of a pay telephone. Such triggering prevents full rotation of the metal door and, therefore, prevents the door from fully opening when the coin receptacle box and cover are inserted into a pay telephone vault and, thus, prevents the proper acceptance of coins by the box. Briefly described, the prior art cover includes a triggering mechanism which is armed by a technician of a pay telephone's owner at a central site. Once armed, the triggering mechanism allows the cover's metal door to rotate in order to uncover the cover's opening when the coin receptacle box and cover are inserted into a pay telephone by a collector. When triggered (as is normally done upon insertion of the box and cover into a pay telephone), the triggering mechanism allows the metal door to rotate toward a position which covers the opening upon removal of the coin receptacle box from the pay telephone and enables the cover to resist forced re-opening of the metal door by a collector attempting to pilfer money from the box. Thus, if the triggering mechanism is accidentally triggered with the metal door already covering the opening (as is the case with an empty coin receptacle box headed for installation into a pay telephone), the cover resists what it believes is a forced re-opening of the metal door and attempted pilfering of money resident in the coin receptacle box. When such accidental triggering, or "false triggering" occurs, the collector must return the box and cover to the technician at the central site for re-arming before it can be installed into a pay telephone. Unfortunately, the prior art cover seems to be excessively prone to such accidental triggering and, hence, creates a great deal of inconvenience for collectors and for the pay telephone owners.

The prior art cover has a third problem which is, perhaps, associated with the triggering mechanism and/or operation of the metal door. Through use of the cover over time, it has become evident that some collectors attempt to steal money from a coupled coin receptacle box by jamming the cover's metal door during removal of the box and cover from a pay telephone. By sticking a jamming object (i.e., a rod, pencil, etc.) into the cover's opening, a collector is able to remove the coin receptacle box and cover from a pay telephone while preventing the entire covering of the cover's opening by the metal door. Then, once the box and cover are out of the pay telephone, the collector removes the jamming object and subsequently removes the coins from the coin receptacle box through the portion of the opening not covered by the metal door.

A fourth problem of the prior art cover has also become evident over time and involves the jamming of the metal door and other components of the cover. During normal operation of a pay telephone and the cover, coins accepted by the telephone fall from the phone's coin handling mechanism and into the coin receptacle box passing through the cover's opening. Unfortunately, a gap between the metal door and the panel of the cover allows some coins to become caught in the gap, thereby jamming operation of the metal door and causing subsequently accepted coins to be directed away from the cover's opening or, possibly, to back up within the phone's coin handling mechanism causing it to malfunction. Such jamming of the metal door by coins also allows the coins to serve as a jamming object, enabling the theft of coins from the coin receptacle box as described above. Additionally, the proper operation of various components of the prior art cover may be restricted, or even curtailed, by coins residing in the coin receptacle box rising, from beneath the cover, to a level sufficient to jam the operation of the components.

Prior efforts to solve these disadvantages and/or problems have proven to be somewhat ineffective or not cost effective. Accordingly, a need yet remains for a means to protect the pay telephone owner from pilferage by collectors responsible for collecting money periodically from the phones which does not induce malfunction of a pay telephone or cause excessive inconvenience to the collectors or to the pay telephone owner. It is to the provision of such a device that the present invention is primarily directed.

SUMMARY OF THE INVENTION

Briefly described, in a first preferred form, the present invention comprises a coin receptacle cover for attachment to a coin receptacle box and subsequent use in a pay telephone. The coin receptacle cover comprises a panel, connectable to a coin receptacle box, which defines an opening therethrough for admitting coins into the coin receptacle box. The cover also comprises a movable door mounted for linear reciprocating movement between a closed position covering the opening and an open position uncovering the opening. An actuator arm is mounted for pivotal movement and includes means engageable by a pay telephone for pivoting the actuating arm upon installation of the coin receptacle cover in a pay telephone. Additionally, the coin receptacle cover comprises means for converting pivotal movement of the actuator arm into linear reciprocating movement of the movable door. Preferably, the means for converting pivotal movement comprises a pin and slot arrangement between the movable door and the actuator arm. Also preferably, the coin receptacle cover further comprises a linear track and the movable door has a guide pin slidable within the linear track. Further, the opening has a substantially rectangular shape and the entirety of the opening is coverable and uncoverable by the movable door.

In a second preferred form, the coin receptacle cover of the present invention comprises a panel, connectable to a coin receptacle box, which defines an opening therethrough for admitting coins into the coin receptacle box. The cover also comprises a movable door mounted for movement between a closed position covering the opening and an open position uncovering the opening, and means for preventing movement of the movable door in a direction toward the open position upon even partial movement of the coin receptacle cover from a pay telephone. Preferably, the means for preventing movement includes a ratcheting pawl for preventing movement of the movable door from at least one substantially closed position in a direction toward the open position. The means for preventing movement also, preferably, further includes a stop which is cooperative with the ratcheting pawl for locking the movable door in the closed position. Also preferably, the coin receptacle cover includes means for causing movement of the movable door in a direction toward the closed position upon removal of an obstruction from the opening.

According to a third preferred form, the present invention comprises a coin receptacle cover having a panel and a movable door substantially similar to those of the invention's second preferred form. The coin receptacle cover further includes a trigger means for enabling the movable door to move in a direction toward the open position of the movable door during installation of the coin receptacle cover into a pay telephone and for enabling the movable door to move in a direction toward the closed position of the movable door after installation of the coin receptacle cover into the pay telephone. The trigger means preferably includes means for preventing accidental triggering of the trigger means. Preferably, the means for preventing accidental triggering comprises a low-mass latch which is closely guided for movement between an armed position and a triggered position. The coin receptacle cover further includes a pawl, cooperative with the low-mass latch, and means for preventing misalignment of the low-mass latch and the pawl.

The present invention, in a fourth preferred form, comprises a coin receptacle cover having a panel and a movable door substantially similar to those of the invention's third preferred form, and further includes means for preventing coins from becoming jammed between the panel and the movable door. Preferably, the means for preventing includes at least a portion of a wall substantially adjacent to the opening of the panel. Also preferably, the means for preventing includes a pin boss substantially adjacent to the opening of the panel. Further, the coin receptacle cover comprises means for preventing restricted movement of the movable door due to coins residing within a coin receptacle box.

The coin receptacle cover, according to the present invention, allows the coin opening in the cover to be uncovered and covered just once upon insertion and removal of the coin receptacle cover in a pay telephone in order to prevent re-opening and pilferage of the coins by a collector. The coin receptacle cover insures that the coin receptacle box is locked and inaccessible as it is removed from the pay telephone. Resetting of the latching mechanism can only be accomplished from inside the coin receptacle cover, necessitating the breaking of a tamper-evident seal.

The invention allows for the acceptance of rather large coins, up to 35 millimeters in diameter (i.e., or other maximum dimension), because the combination of the linearly reciprocating door in conjunction with the pivoting actuator arm allows a very large opening to be provided in the cover and yet enables the opening to be covered and uncovered by the rather limited pivotal movement of the actuator arm (as the cover must be used in existing pay telephones, the range of motion available to the actuator arm is limited by the configuration of existing pay telephones). Also, the invention prevents the coin receptacle cover from being falsely triggered, as for example by the cover being dropped by accident. Additionally, the translatory movement of the movable door, effected by the pivoting actuator arm, results in extremely smooth operation of the apparatus without binding.

Accordingly, it is an object of the present invention to provide a coin receptacle cover for a coin receptacle box which is capable of accepting rather large coins.

It is another object of the present invention to provide a coin receptacle cover for a coin receptacle box which operates smoothly.

It is another object of the present invention to provide a coin receptacle cover for a coin receptacle box which avoids accidental jamming by coins.

It is another object of the present invention to provide a coin receptacle cover for a coin receptacle box which avoids inadvertent triggering of its latching mechanism.

It is another object of the present invention to provide a coin receptacle cover for a coin receptacle box which prevents tampering during removal (or afterwards) of the coin receptacle from a pay telephone.

It is another object of the present invention to provide a coin receptacle cover for a coin receptacle box which is durable in construction, economical in manufacture, and simple in operation.

These and other objects, features and advantages of the present invention will become more apparent upon reading of the following specification in conjunction with the accompanying drawing figures.

BRIEF DESCRIPTION OF THE DRAWING FIGURES

FIG. 7 is a top, plan view of an actuator arm of the coin receptacle cover of FIG. 2.

FIG. 8 is a top, plan view of a movable door of the coin receptacle cover of FIG. 2.

FIG. 9 is a partial sectional view taken along section lines 9—9 of FIG. 3 showing a latching mechanism and a pawl of the coin receptacle cover of FIG. 2.

DETAILED DESCRIPTION OF THE PREFERRED EMBODIMENT

Figure 1:
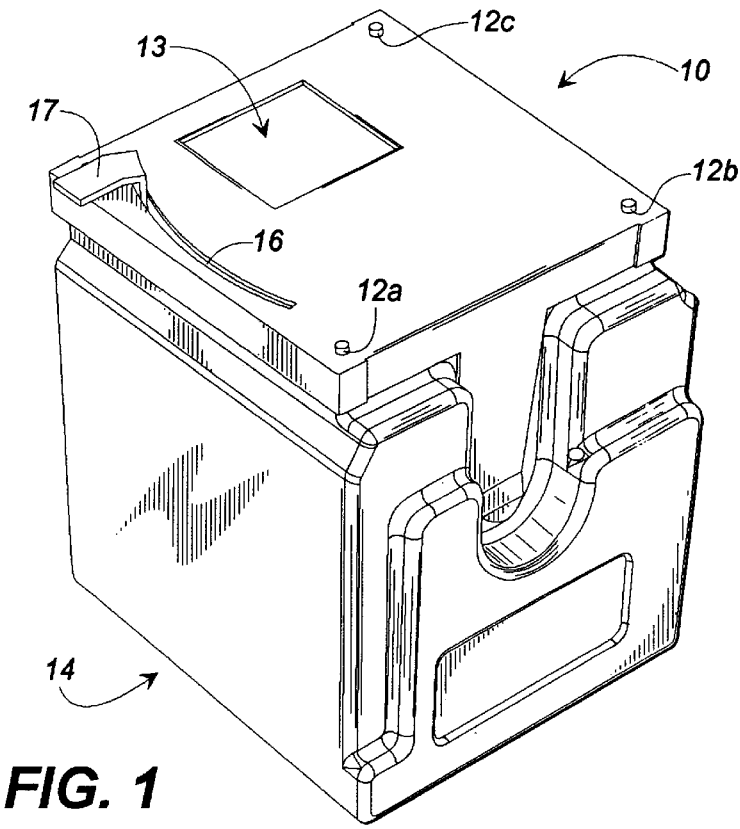
FIG. 1 is a front perspective view of a coin receptacle cover, according to a preferred embodiment of the present invention, attached to a coin receptacle box.

Referring now in detail to the drawing figures, wherein like reference numerals represent like parts throughout the several views, FIG. 1 displays a coin receptacle cover 10, according to a preferred embodiment of the present invention, coupled to a conventional, commercially available coin receptacle box 14 for use in a commercially available pay telephone. The coin receptacle box 14 has a cavity therein for storing coins deposited in the pay telephone and also has a substantially open top through which coins fall into the cavity. Because the design of the pay telephone and the coin receptacle box 14 are well-known to those reasonably skilled in the art, further description of the details of the pay telephone and the coin receptacle box 14 are not necessary herein.

Figure 2:
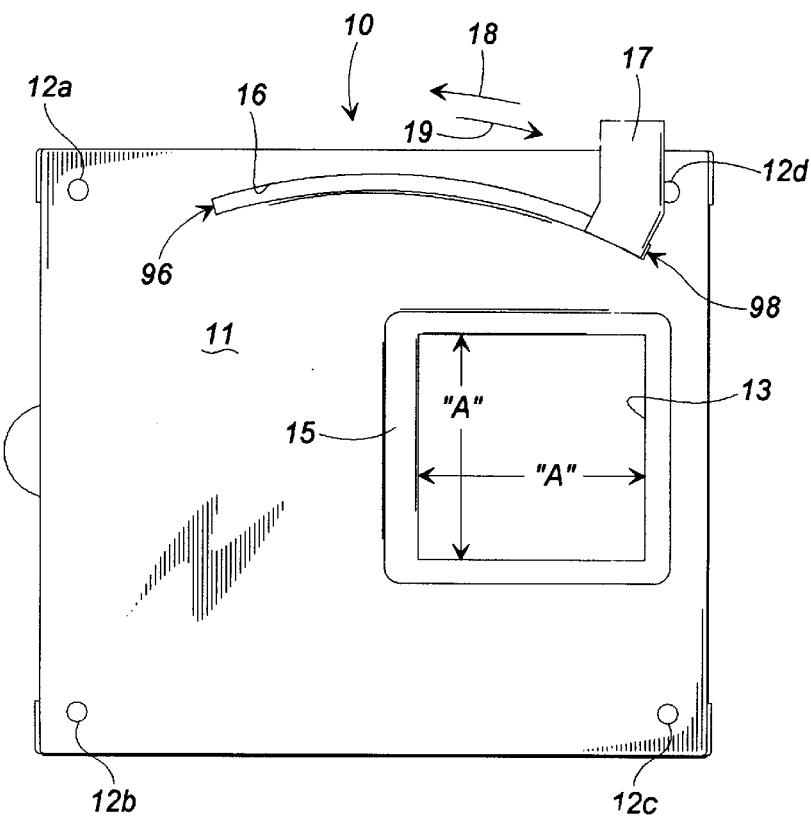
FIG. 2 is a top, plan view of the coin receptacle cover of FIG. 1.

The cover 10, seen also in the top plan view of FIG. 2, comprises an upper panel 11 residing atop the coin receptacle box 14. The upper panel 11 is substantially square in overall configuration and is, preferably, fabricated from steel to resist possible tampering and theft. The upper panel 11 includes four mounting holes, 12a through 12d, near its corners for receipt of rivets which secure the upper panel 11 to a lower panel 51 of the cover 10, described below. The upper panel 11 also includes a large, square coin opening 13 therethrough and a lip 15 which extends around the perimeter of the coin opening 13. In the preferred commercial embodiment described herein, the coin opening 13 has a side length, "A", measuring 35 millimeters to enable large coins (including, but not limited to, those coins having a diameter, or maximum dimension, measuring at least 35 millimeters) to pass easily through the coin opening 13 and through the cover 10.

The upper panel 11 has an arcuate slot 16 which receives a finger 17 extending therethrough. The finger 17 is part of a shutter assembly 20, described below, for covering and uncovering the coin opening 13. The finger 17 engages a portion of the pay telephone (unshown) such that as the coin receptacle box 14 and cover 10 are inserted into the pay telephone, a portion of the pay telephone engages the finger 17 to move it in the direction indicated by direction arrow 18 to cause uncovering of the coin opening 13 by movable door 22 (i.e., translating in an opening direction indicated by arrow 95) until the finger 17 reaches its "open position" (see FIG. 4) at end 96 of slot 16, corresponding to the open position of movable door 22 (described below). Conversely, as the coin receptacle box 14 and cover 10 are removed from the pay telephone, the finger 17 is allowed to move back in the direction indicated by direction arrow 19 to cause covering of the coin opening 13 by movable door 22 (i.e., translating in a closing direction indicated by arrow 97) until the finger 17 reaches its "closed position" (see FIG. 5) at end 98 of slot 16, corresponding to the closed position of movable door 22. Note that, as seen in FIG. 6, when the finger 17 has rotated into an intermediate angular position (indicated by angle, $\alpha_3$) halfway between ends 96, 98 of slot 16, the movable door 22 has translated into an intermediate position half-way between its open and closed positions, thereby insuring smooth, non-binding operation of the movable door 22.

Figure 3:
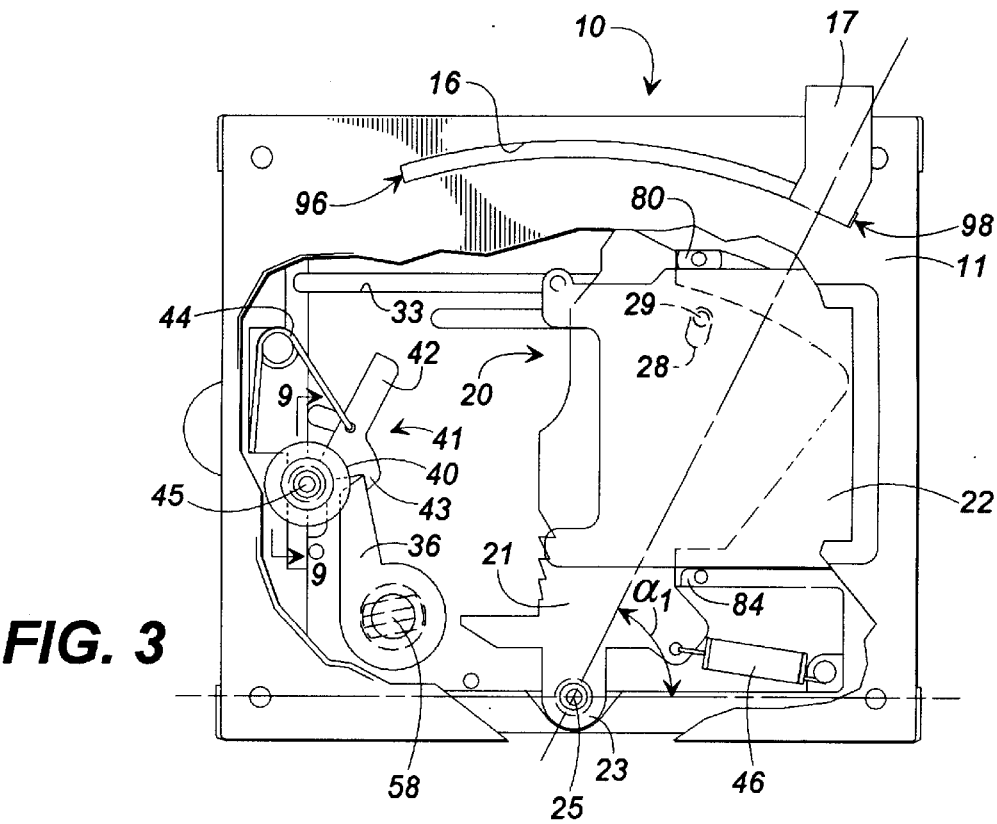
FIG. 3 is a partial cut-away, top, plan view of the coin receptacle cover of FIG. 2, shown in an armed, ready-to-be-installed configuration.
Figure 4:
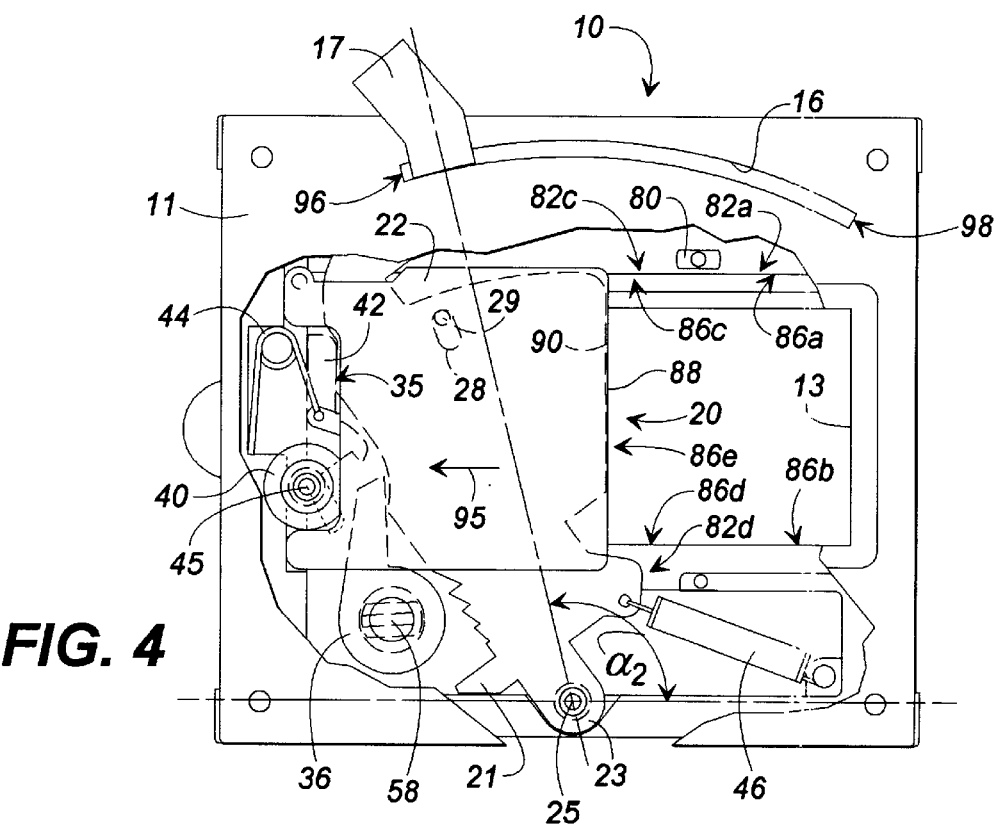
FIG. 4 is a partial cut-away, top, plan view of the coin receptacle cover of FIG. 2, shown in a triggered, installed configuration.
Figure 5:
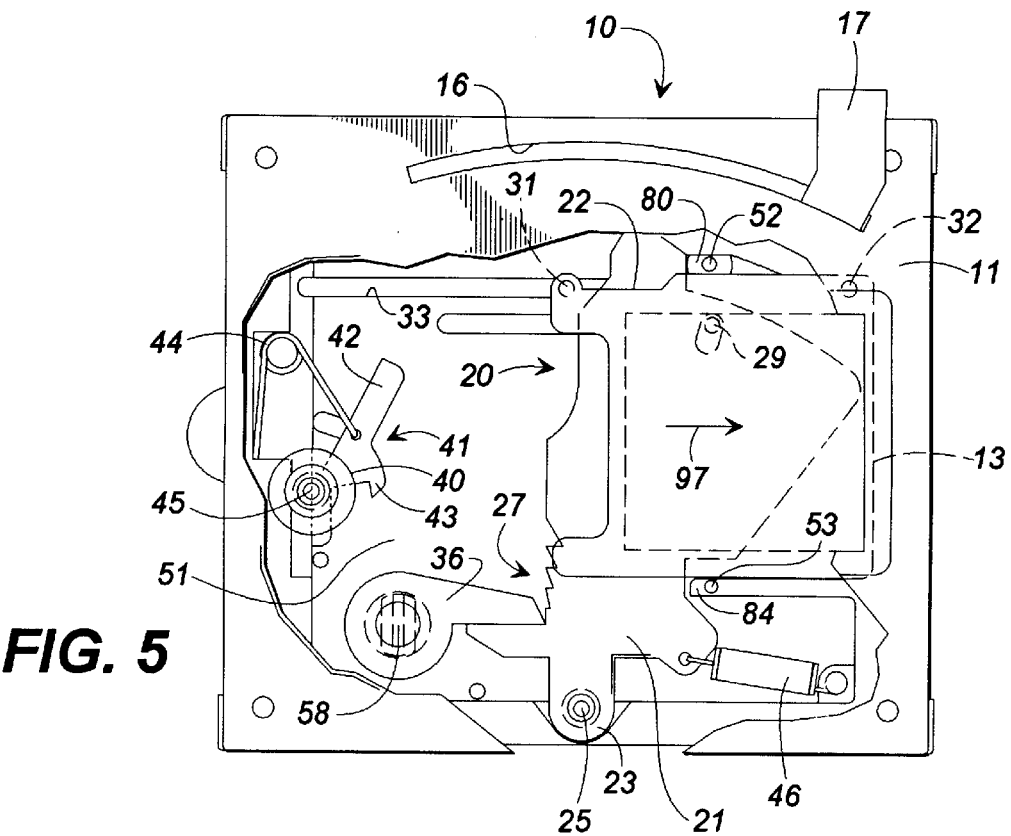
FIG. 5 is a partial cut-away, top, plan view of the coin receptacle cover of FIG. 2, shown in a triggered and locked (removed) configuration.
Figure 6:
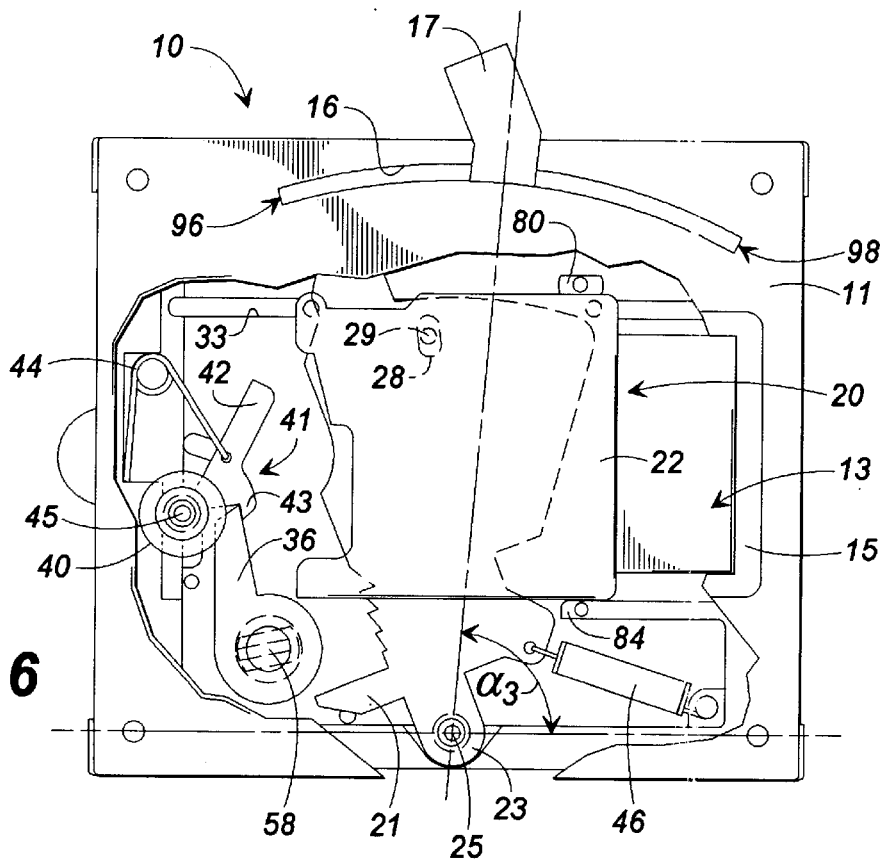
FIG. 6 is a partial cut-away, top, plan view of the coin receptacle cover of FIG. 2, shown in an intermediate configuration.

Referring now to FIGS. 3–5, the cover 10 further comprises a shutter assembly 20, of which finger 17 is a part, for covering and uncovering the coin opening 13. The shutter assembly 20 includes an irregularly-shaped actuator arm 21 and a substantially rectangular movable door 22 (i.e., movable by sliding or by reciprocating linearly) which are shown in isolation in FIGS. 7 and 8, respectively. As shown in FIG. 7, the irregularly-shaped actuator arm 21 includes the finger 17 and a pivoting end 23 having a pivot hole 25 (i.e., for receipt of a pivot pin) therethrough. The actuator arm 21 further includes a rotation stop 24 for limiting clockwise rotational movement of a pawl 36 as described below. The actuator arm 21 also includes a pawl engaging surface 26 for cooperating with the pawl 36 to prevent the actuator arm 21 from being rotated counterclockwise about the center of pivot hole 25 and, hence, about pivot end 23 when the movable door 22 is in its closed position after removal of the cover 10 from a pay telephone. Furthermore, the actuator arm 21 includes a series of ratchet teeth 27 which also cooperate with the pawl 36 to lock the actuator arm 21 in one of several positions in which the movable door 22 is nearly closed. The actuator arm 21 also includes an elongated slot (or guide track) 28 formed therethrough and a curved channel 30 near finger 17 which partially receives rivet boss 80 of lower panel 51 (described below), as seen in FIGS. 3 and 5. An indent 34, opposite ratchet teeth 27, partially receives rivet boss 84 of lower panel 51 (described below) when the movable door 22 is in its closed position and a hole 47 receives an end of a spring 46 which also connects to the upper panel 11. Additionally, the actuator arm 21 has an arcuate edge 35 located near the ratchet teeth 27 which engages a latch mechanism 41 described below.

According to the preferred embodiment, the movable door 22, displayed in FIG. 8, is substantially rectangular in overall shape and resides substantially atop the actuator arm 21 (see FIGS. 3–5). The movable door 22 is, preferably, fabricated from steel to resist tampering. Near an edge portion thereof, the movable door 22 includes a connector pin 29 which is slidably received within the elongated slot 28 of the actuator arm 21 (see FIGS. 3–5). The movable door 22 also includes a pair of upper guide pins 31, 32 which cooperate with an elongate, linear guide track 33 (see FIGS. 3 and 5) to guide the movement of the movable door 22 and to restrict its movement to a linear, reciprocating type of motion. The guide pins 31, 32, the guide track 33, the elongate slot 28, and the connector pin 29 (i.e., the "cooperative elements") cooperate to allow the rotational or pivoting movement of the actuator arm 21 to be converted into linear, reciprocating motion of the movable door 22. Note that the angle of rotation, $\alpha$, of the actuator arm 21 (about the center of pivot hole 25) has a maximum measure between a first angle of rotation, $\alpha_1$, and a second angle of rotation, $\alpha_2$, which are pre-determined (i.e., fixed) by the amount of movement of finger 17 possible (i.e., the stroke length pre-determined by the internal components of the pay telephone) during insertion and/or removal of the coin receptacle box 14 and cover 10 into/from a pay telephone. Also, note that the maximum dimensions of the cover 10 (and, hence, the amount of available space for receipt of a door 22) are substantially fixed and/or restricted in order to enable the cover 10 to cooperate with existing pay telephones and coin receptacle boxes 14. By producing linear, reciprocating motion of a door 22 instead of the rotary motion of a door, as in the prior art, with the limited rotary movement of the actuator arm 21 and within the confined dimensions of a cover 10, the "cooperating elements" enable the size of the door 22 and the coin opening 13 to be substantially larger than doors and coin openings of prior art devices, thereby enabling the cover 10 of the present invention to accept coins of larger maximum dimension than prior art devices. The acceptance of larger coins is of import when using the cover 10 in pay telephones of foreign countries which may have coins of larger maximum dimension than the coins of the United States. The "cooperating elements" also enable a relatively large coin opening 13 (i.e., larger than those possible with prior art devices) to be completely covered and uncovered, thereby making the entire coin opening 13 available to pass a coin falling toward the coin receptacle box 14.

The movable door 22 also includes an edge 37 having a beveled portion 38 and an adjacent recessed portion 39. The beveled portion 38 insures that the latch mechanism 41, described below, is appropriately directed into contact with arcuate edge 35 of the actuator arm 21. The recessed portion 39 prevents substantial contact of various parts of the latch mechanism 41 with the movable door 22 when the door 22 is positioned, as seen in FIG. 4, in the open position.

Referring again to FIGS. 3–5, a spring-biased pawl 36 is pivotally mounted for rotation between an armed position shown in FIG. 3, a triggered (but unlocked) position shown in FIG. 4, and a triggered and locked position shown in FIG. 5. Furthermore, from viewing FIG. 5, one can readily see that the pawl 36 (and, hence the actuator arm 21 and movable door 22) can be locked in some additional substantially closed positions by engaging the ratchet teeth 27 and the pawl 36. The ratchet teeth 27 and the pawl 36 cooperate to prevent an individual from obstructing the movable door 22 and, hence, the shutter assembly 20 from completely closing (and leaving the coin opening 13 partially or entirely uncovered) as the coin receptacle box 14 and cover 10 are removed from the pay telephone and then subsequently pushing the movable door 22 and, hence, the shutter assembly 20 back open to gain access to the coins contained in the coin receptacle box 14. By the interaction of the ratchet teeth 27 and the pawl 36 shown and described herein, the movable door 22 and, hence, the shutter assembly 20 can be locked in a nearly closed position, thereby preventing the movable door 22 and, hence, the shutter assembly 20 from being forced back open. Once the obstruction is removed, the movable door 22 and the shutter assembly 20 continue to the fully closed position shown in FIG. 5, thereby making the cover 10 tamper resistant. Note that, in order to aid in preventing an individual from forcing open the movable door 22 and the shutter assembly 20 after the movable door 22 is in the closed position or in a nearly closed position, the moment about the pawl 36 is kept low and the pawl spring tension is kept high.

The cover 10 further comprises a latch mechanism 41 (i.e., a triggering mechanism) for triggering the pawl 36. The latch mechanism 41 is pivotally mounted and includes a trigger finger 42 and a hook 43 for securing the pawl 36. The latch mechanism 41 and the pawl 36 lie in substantially the same plane, "F", as illustrated in FIG. 9. A spring 44 is used to bias the latch mechanism 41 in the armed position (see FIG. 3). The hook 43, as illustrated in FIG. 3, retains the pawl 36 in the armed position prior to insertion of the coin receptacle box 14 and cover 10 into a pay telephone. As shown in FIG. 4, the trigger finger 42 engages arcuate edge 35 of the actuator arm 21 as the coin receptacle box 14 and cover 10 are mounted within a pay telephone (i.e., because the actuator arm 21 rotates counterclockwise toward the latch mechanism 41 during insertion within a pay telephone), thereby causing the trigger finger 42 to rotate slightly in a counterclockwise direction and releasing the pawl 36 for clockwise rotation against the actuator arm 21.

In order to reduce the likelihood of false-triggering (i.e., premature release of the pawl 36 by the latch mechanism 41) should the coin receptacle box 14 and/or cover 10 incur mechanical shock due to being dropped during transport to a pay telephone or during installation into a pay telephone, moments created by the pawl 36 and the latch mechanism 41, about their respective axes of rotation, are kept as low as possible by, for instance, keeping the relative masses of the pawl 36 and latch mechanism 41 low. This is important since the collector transporting or installing the coin receptacle box 14 and cover 10 cannot re-arm the latch mechanism 41 and would be forced to return the box 14 and cover 10 to the pay telephone's owner for re-arming. The risk of false-triggering (i.e., accidental triggering) is also reduced by the presence of a lower panel 51, described below, which "sandwiches" the latch mechanism 41 and the pawl 36 between the lower panel 51 and the upper panel 11 and restricts non-planar, relative movement between the latch mechanism 41 and the pawl 36 (see FIG. 9). A washer 40, centered about the pivot point 45 of the latch mechanism 41, resides adjacent the latch mechanism 41 and a portion of the pawl 36 (see FIGS. 3, 6, and 9). The washer 40, like the upper and lower panels 11, 51, serves to aid in maintaining the planar alignment of the latch mechanism 41 and the pawl 36 by guiding their movement, thereby further reducing the risk of false-triggering. Spring 46 additionally aids in preventing false-triggering of the latch mechanism 41.

Once the latch mechanism 41 is triggered and, hence, pawl 36 is released, the movable door 22 and shutter assembly 20 are urged to cover the coin opening 13 as illustrated in FIG. 5. The pawl 36, biased by a coil spring (not visible), rotates clockwise contacting the actuator arm 21 as the actuator arm 21 rotates about pivot end 23. The pawl 36, typically, continues its rotation until engaging the rotation stop 24 of the actuator arm 21. After the pawl 36 engages the rotation stop 24, the actuator arm 21 cannot rotate counterclockwise and, hence, the movable door 22 is prevented from linear reciprocating movement in the opening direction, indicated by arrow 95, which would uncover the coin opening 13.

Figure 10:
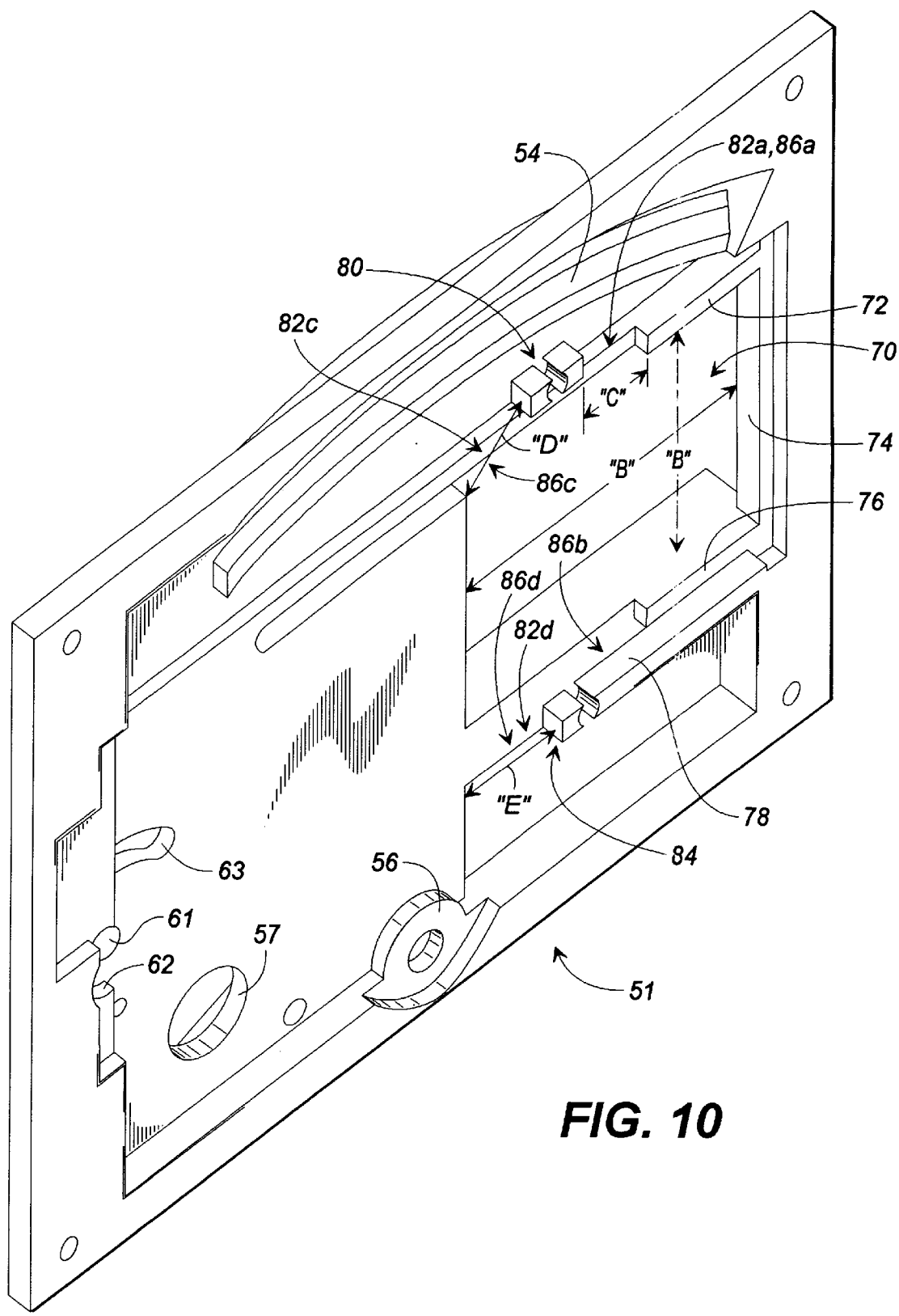
FIG. 10 is a top, perspective view of a lower panel of the coin receptacle cover of FIG. 2.

According to the preferred embodiment, the cover 10 includes a lower panel 51 (see FIG. 10) mounted to and beneath the upper panel 11. The lower panel 51 is, preferably, manufactured from molded plastic and is secured to the exterior panel 11 using rivets 52 and 53 (received by rivet bosses 80, 84, respectively) to substantially shield the working components (i.e., the shutter assembly 20, the latch mechanism 41, and the pawl 36 which reside between the upper and lower panels 11, 51) of the cover 10 from coins residing within the coin receptacle box 14. Such shielding prevents potential jamming of the working components from coins within the coin receptacle box 14 should the number of coins be sufficient to bring coins into close proximity with the cover 10. As shown in FIG. 10, the lower panel 51 includes a large arcuate slot 54 (i.e., which aligns with slot 16 upon assembly) for receiving finger 17 therethrough. The lower panel 51 also includes a pivot boss 56, with a pivot bore 55 formed therethrough, to which the pivot end 23 of the actuator arm 21 is pivotally mounted. A large pivot bore 57 is formed in the lower panel 51 for pivotally mounting the pawl 36. Note that the pawl 36 has slot 58 therein to enable receipt, for instance, of a screwdriver blade for arming of the cover 10 (see FIG. 3). The lower panel 51 further includes a pivot bore 61 and pivot boss 62 for pivotally mounting the latching mechanism 41. Also, an elongate slot 63 (arcuately shaped) is formed in the lower panel 51 for allowing motion of spring 44 to follow the trigger finger 42 when it rotates.

The lower panel 51 defines a large, square coin opening 70 therethrough which is oriented in alignment with the coin opening 13 of the upper panel 11. In the preferred commercial embodiment described herein, the coin opening 70 has a side length, "B", measuring 35 millimeters (i.e., like coin opening 13) to enable large coins (including, but not limited to, those coins having a diameter, or maximum dimension, measuring at least 35 millimeters) to pass easily through the coin opening 70. Walls 72, 74, 76 reside adjacent to the coin opening 70 and extend partially about the perimeter of coin opening 70. Wall 78 resides substantially adjacent to the coin opening 70 and wall 76. The lower panel 51 also includes a rivet boss 80 adjacent to the coin opening 70 and separated from wall 72 by a gap 82 having a width, "C". Another rivet boss 84 extends from wall 78 substantially adjacent to the coin opening 70 and between the upper and lower panels 11, 51.

Note that in FIGS. 4 and 10 arrows indicate a number of possible sites 86 where a coin passing through coin openings 13, 70 might attempt to enter the cover 10 between the upper and lower panels 11, 51 (i.e., when the movable door 22 is in its open position) and become wedged, thereby restricting translation of the movable door 22 and, perhaps, jamming movement of the door 22. For example, a coin might attempt to enter the space between the upper and lower panels 11, 51 at site 86a through gap 82a. However, gap 82a is bounded by wall 72 and rivet boss 80 which extend between the upper and lower panels 11, 51 and define the width, "C", of gap 82a to be sufficiently small as to not allow the smallest of coins to pass through the gap 82a. Similarly, a coin attempting to enter the cover 10 at site 86b is blocked from entry by wall 78. With regard to site 86c and site 86d, rivet bosses 80, 84 and edge 88 of the movable door 22 (and also edge 90 of the actuator arm 21) define gaps 82c, 82d therebetween having widths, "D", "E", respectively. Like the width, "C" of gap 82a, the widths "D", "E" of gaps 82c, 82d are sufficiently small as to not allow the smallest of coins to pass through the gaps 82c, 82d. Site 86e is blocked by edge 88 of the movable door 22 and edge 90 of the actuator arm 21. Thus, the various positions and sizes of the walls 72, 74, 76, 78, the rivet bosses 80, 84, the movable door 22, and the actuator arm 21 prevent even the smallest of coins from entering the cover 10 or from becoming wedged between the movable door 22 and one of the upper or lower panels 11, 51.

Operation of the coin receptacle cover 10 is straightforward. In use, the internal latching mechanism 41 is armed with the cover 10 removed from its associated coin receptacle box 14, at a central location, by positioning a screwdriver blade into slot 58 of the pawl 36. Then, by counterclockwise rotation of the screwdriver blade (and, hence, counterclockwise rotation of the pawl 36), the pawl 36 engages hook 43 of the latching mechanism 41 to place the cover 10 in the armed configuration as shown in FIG. 3. The cover 10 is then replaced and secured to the coin receptacle box 14 with a tamper-evident seal. Once the cover 10 is armed and the cover 10 and box 14 are secured, the coin receptacle box 14 and the cover 10 are given to an individual responsible for installing the coin receptacle box 14 and servicing a pay telephone in the field. To collect the money from a pay telephone, a resident coin receptacle box 14 and cover 10 are removed from the pay telephone (and replaced with an empty box and cover assembly). The act of removal causes the finger 17 and, hence, the actuator arm 21 of the removed cover 10 to rotate clockwise about pivot end 23, pawl 36 to rotate clockwise into engagement with rotation stop 24, and movable door 22 to translate into the position shown in FIG. 5. Engagement of the pawl 36 and the actuator arm 21 with the pawl 36 substantially adjacent the rotation stop 24 locks the actuator arm 21 and, therefore, the movable door 22 in a position covering the coin opening 13. The locked unit (i.e., the cover 10 and coin receptacle box 14) is returned to a central location with the tamper-evident seal remaining intact, thereby ensuring that no pilferage of coins has taken place. The act of inserting the empty box and cover unit into the pay telephone causes finger 17 and, therefore, arcuate edge 35 of the actuator arm 21 to rotate counterclockwise, about pivot end 23, into contact with the trigger finger 42 of the latching mechanism 41. Upon sufficient rotation of finger 17 and sufficient counterclockwise rotation of the latching mechanism 41, the hook 43 pivots and releases pawl 36 into contact with the actuator arm 21 as depicted in FIG. 4. Rotation of the actuator arm 21 also causes the movable door 22 to translate in the opening direction indicated by arrow 95 into the fully-open position of FIG. 4, where the coin openings 13, 70 are entirely uncovered allowing coins to fall through the cover 10 and into the coin receptacle box 14. The coin openings 13, 70 remain uncovered until the coin receptacle box 14 and cover 10 are removed from the pay telephone.

While the invention has been disclosed in preferred form, it will be apparent to those skilled in the art that many modifications, additions and deletions can be made therein without departing from the spirit and scope of the invention as set forth in the following claims.

What is claimed is:

1. A coin receptacle cover for attachment to a coin receptacle box and use in a pay telephone, comprising:

a panel connectable to a coin receptacle box, said panel defining an opening therethrough for admitting coins into the coin receptacle box; and, a movable door mounted for linear reciprocating movement between a closed position covering said opening and an open position uncovering said opening.

2. The coin receptacle cover of claim 1 wherein said coin receptacle cover further comprises an actuator arm mounted for pivotal movement and including means engageable by a pay telephone for pivoting said actuator arm upon installation of said coin receptacle cover in a pay telephone, and means for converting pivotal movement of said actuator arm into linear reciprocating movement of said movable door.

3. The coin receptacle cover of claim 2 wherein said means for converting comprises a pin and slot arrangement between said movable door and said actuator arm.

4. The coin receptacle cover of claim 2 wherein said actuator arm is pivotable between a first angular position and a second angular position to an intermediate angular position located half-way between said first and second angular positions, and said movable door is translatable to an intermediate position half-way between said closed position and said open position, said intermediate position corresponding to said intermediate angular position of said actuator arm.

5. The coin receptacle cover of claim 1 wherein said opening is sufficiently large to allow coins measuring as large as 35 millimeters in maximum size dimension to pass through said opening.

6. The coin receptacle cover of claim 1 wherein said opening has a substantially rectangular shape and the entirety of said opening is coverable and uncoverable by said movable door.

7. The coin receptacle cover of claim 6 wherein said coin receptacle cover further comprises an actuator arm having an end, said actuator arm being pivotally mounted at said end for rotation relative to said end between a first angular position and a second angular position pre-determined by a pay telephone, and means for translating said movable door between said closed position corresponding to said first angular position of said actuator arm and said open position corresponding to said second angular position of said actuator arm.

8. The coin receptacle cover of claim 1 wherein said coin receptacle cover further comprises a linear track, and said movable door comprises a guide pin slidable within said linear track.

9. A coin receptacle cover for attachment to a coin receptacle box and use in a pay telephone, comprising:

a panel connectable to a coin receptacle box, said panel defining an opening therethrough for admitting coins into the coin receptacle box;

a movable door mounted for movement between a closed position covering said opening and an open position uncovering said opening; and, means for preventing movement of said movable door in a direction toward said open position upon at least partial removal of said coin receptacle cover from a pay telephone.

10. The coin receptacle cover of claim 9 wherein said means for preventing movement comprises a ratcheting pawl for preventing movement of said movable door from at least one substantially closed position in a direction toward said open position.

11. The coin receptacle cover of claim 10 wherein said means for preventing movement further comprises a stop cooperative with said ratcheting pawl for locking said movable door in said closed position.

12. The coin receptacle cover of claim 9 wherein said coin receptacle cover further comprises means for causing movement of said movable door in a direction toward said closed position upon removal of an obstruction from said opening.

13. The coin receptacle cover of claim 12 wherein said means for causing movement comprises a biasing member.

14. A coin receptacle cover for attachment to a coin receptacle box and use in a pay telephone, comprising:

a panel connectable to a coin receptacle box, said panel defining an opening therethrough for admitting coins into the coin receptacle box;

a movable door mounted for movement between a closed position covering said opening and an open position uncovering said opening;

trigger means for enabling said movable door to move in a direction toward said open position during installation of said coin receptacle cover into a pay telephone and for enabling said movable door to move in a direction toward said closed position after installation of said coin receptacle cover into the pay telephone; and, means for preventing accidental triggering of said trigger means.

15. The coin receptacle cover of claim 14 wherein said means for preventing accidental triggering comprises a latch closely guided for movement between an armed position and a triggered position.

16. The coin receptacle cover of claim 15 wherein said coin receptacle cover further comprises a pawl cooperative with said latch, and said means for preventing accidental triggering further comprises means for preventing misalignment of said latch and said pawl.

17. The coin receptacle cover of claim 16 wherein said means for preventing misalignment comprises a washer positioned adjacent to said latch and said pawl.

18. A coin receptacle cover for attachment to a coin receptacle box and use in a pay telephone, comprising:

a panel connectable to a coin receptacle box, said panel defining an opening therethrough for admitting coins into the coin receptacle box;

a movable door mounted for movement between a closed position covering said opening of said panel and an open position uncovering said opening of said panel; and, means for preventing coins from becoming jammed between said panel and said movable door.

19. The coin receptacle cover of claim 18 wherein said means for preventing comprises at least a portion of a wall substantially adjacent said opening of said panel.

20. The coin receptacle cover of claim 18 wherein said means for preventing comprises a pin boss substantially adjacent said opening of said panel.

21. The coin receptacle cover of claim 18 wherein said coin receptacle cover further comprises means for preventing restricted movement of said movable door due to coins residing within the coin receptacle box.

22. The coin receptacle cover of claim 21 wherein said panel is an upper panel, and said means for preventing restricted movement comprises a lower panel connected beneath said upper panel and defining an opening therethrough for admitting coins into the coin receptacle box, said opening of said lower panel being aligned with said opening of said upper panel.

\* \* \* \* \*